No. 788,065. PATENTED APR. 25, 1905.
G. W. REIMAN.
WEED HOOK FOR PLOWS.
APPLICATION FILED JAN. 18, 1905.
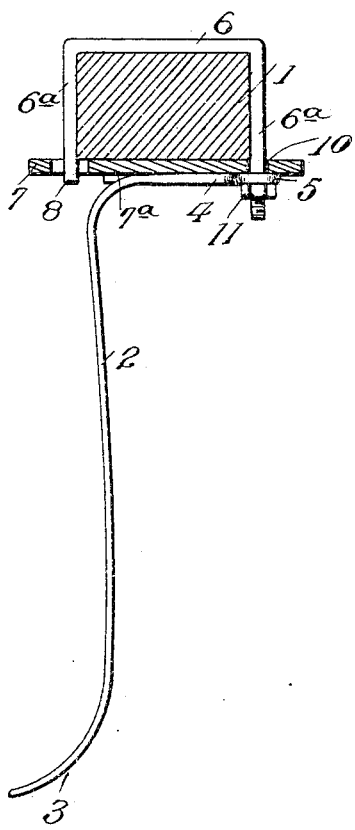
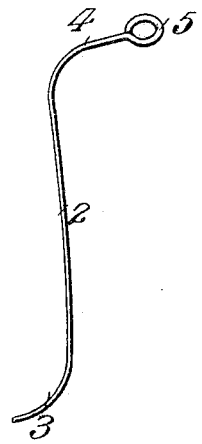
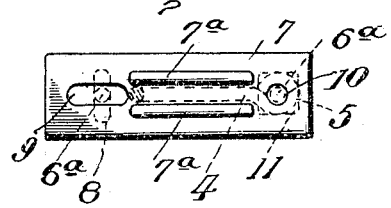
Inventor
George W. Reiman.
Witnesses
By,
R. & A. B. Lacey, Attorneys No. 788,065. Patented April 25, 1905.

UNITED STATES PATENT OFFICE.

GEORGE W. REIMAN, OF MURPHYSBORO, ILLINOIS.

WEED-HOOK FOR PLOWS.

SPECIFICATION forming part of Letters Patent No. 788,065, dated April 25, 1905.

Application filed January 18, 1905. Serial No. 241,655.

*To all whom it may concern:*

Be it known that I, GEORGE W. REIMAN, a citizen of the United States, residing at Murphysboro, in the county of Jackson and State of Illinois, have invented certain new and useful Improvements in Weed-Hooks for Plows, of which the following is a specification.

This invention consists of an attaching device adapted to be secured to a plow-beam in advance of the share and designed for throwing weeds or similar growth to one side as the furrow is being drawn in order to cover such growth as the implement advances over the field.

The invention comprises what is ordinarily termed a "weed-hook," and the essential feature thereof consists in the provision of a peculiar construction of device of this class and means for securing the same to a plow.

A further feature of the invention consists in the construction of the parts whereby the weed-hook is adapted for reversal as regards its position upon the beam of the plow, this being advantageous when the implement is provided with a point which may also be reversed to turn the soil either to the right or to the left.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features of the invention, still the preferred embodiment thereof is shown in the accompanying drawings, in which—

Figure 1 is a vertical sectional view through a plow-beam having the invention applied thereto. Fig. 2 is a detail perspective view of the weed-hook alone. Fig. 3 is a bottom plan view bringing out more clearly the construction of the clamp-plate of the clamping device.

Corresponding and like parts are referred to in the following description and indicated in all the views of the drawings by the same reference characters.

The plow-beam is designated 1 in the drawings and is of any of the types which are commonly employed in agricultural implements of the type for which the invention is designed. The weed-hook 2 is secured to the beam 1 upon the under side of the latter, and said hook is curved in its length, the lower end thereof curving or projecting laterally, as shown at 3. The upper end of the hook 2 is provided with an angularly-extending tang 4, the extremity of which is formed with an opening 5, by which the device is adapted for attachment to the beam by a bolt or similar fastening means. It is preferred, however, to secure the hook to the beam 1 by means of a clamp, a special construction of which is utilized, said clamp consisting of a U-shaped member 6 and a clamp-plate 7. One of the sides $6^a$ of the member 6 is provided with a transverse head or enlargement 8, which is adapted to pass through an elongated opening 9 in the plate 7, the length of the opening 9 being substantially the same or slightly greater than the length of the head 8 aforesaid. When the head 8 of the member 6 has been passed through the opening 9 of the clamp-plate 7, said plate 7 may be turned in such a manner as to readily prevent displacement thereof. The opening 9 of the plate 7 is near one end thereof, the other end portion of the plate having a second smaller opening 10, receiving the other side $6^a$ of the clamp member 6. The side $6^a$ of the clamp member 6 which passes through the opening 10 of the plate 7 when the parts of the clamp device are assembled is slightly longer than the other side of the member 6 and is threaded so as to receive a nut 11. The nut 11 is screwed against the tang 4 of the weed-hook when the longer side of the member 6 has been passed through the opening 5 in said tang, and the hook 2 is thereby firmly clamped to the clamp device, which device is of course substantially held to the beam in an obvious manner. The opening 5 in the tang 4 may be formed by bending the end portion of the tang in the form of a ring.

It will be readily comprehended that when the hook 2 is secured to the beam the lower curved portion 3 and the body of the hook will effectively deflect weeds or similar growth, so that such growth will be thoroughly covered by the furrow as it is drawn by the plow in rear of the hook.

As shown in Fig. 3, the under side of the clamp-plate 7 may be provided with spaced ribs or flanges 7ª, between which the tang may rest when it is firmly secured to the clamp device by the nut 11. The portions 7ª of the plate 7 will prevent any looseness or play of the tang by which the hook might eventually become displaced, and thus the hook is firmly held in its proper position under all conditions of service.

The invention is very simple in general construction and may be readily applied and removed and also reversed when this last operation becomes necessary.

Having thus described the invention, what is claimed as new is—

1. In combination, a clamp device consisting of a clamp member of approximately U form, one of the sides of the clamp member being provided with a head transversely thereof, the other side of the clamp member having a nut threaded thereon, a clamp-plate provided at one end with an elongated opening to receive the head of the clamp member aforesaid and at its opposite end with an opening to receive the side of the clamp member having the clamp-nut thereon, and a weed-hook secured to the clamp device by the nut and having its lower end curved.

2. In combination, a clamp device embodying a clamp-plate having spaced projecting portions, a weed-hook embodying a tang received between the projecting portions of the clamp-plate, and securing means for attaching the weed-hook to the clamp device.

In testimony whereof I affix my signature in presence of two witnesses.

GEORGE W. REIMAN. [L. S.]

Witnesses:
 B. S. SMITH,
 C. H. ALLEN.